(12) United States Patent
Bao et al.

(10) Patent No.: US 12,150,103 B2
(45) Date of Patent: Nov. 19, 2024

(54) CARRIER AGGREGATION PARAMETER CONFIGURATION METHOD, DEVICE, AND SYSTEM

(71) Applicant: VIVO MOBILE COMMUNICATION CO., LTD., Guangdong (CN)

(72) Inventors: Wei Bao, Guangdong (CN); Qian Zheng, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 353 days.

(21) Appl. No.: 17/576,600

(22) Filed: Jan. 14, 2022

(65) Prior Publication Data
US 2022/0141824 A1 May 5, 2022

Related U.S. Application Data

(63) Continuation of application No. PCT/CN2020/100002, filed on Jul. 2, 2020.

(30) Foreign Application Priority Data

Jul. 22, 2019 (CN) .......................... 201910663387.1

(51) Int. Cl.
*H04W 72/0453* (2023.01)
*H04L 5/00* (2006.01)

(52) U.S. Cl.
CPC ....... *H04W 72/0453* (2013.01); *H04L 5/0092* (2013.01); *H04L 5/0098* (2013.01)

(58) Field of Classification Search
CPC . H04W 72/0453; H04W 76/14; H04W 92/18; H04W 4/46; H04W 72/20; H04L 5/0092; H04L 5/0098; H04L 5/001; H04L 5/0053
See application file for complete search history.

(56) References Cited

U.S. PATENT DOCUMENTS

| | | |
|---|---|---|
| 2014/0247802 A1* | 9/2014 | Wijting ............. H04W 72/0453 370/329 |
| 2015/0271852 A1 | 9/2015 | Rahman et al. |
| 2019/0159150 A1 | 5/2019 | Nguyen et al. |
| 2020/0178213 A1 | 6/2020 | Xu et al. |
| 2020/0235887 A1 | 7/2020 | Hou et al. |

(Continued)

FOREIGN PATENT DOCUMENTS

| | | |
|---|---|---|
| CN | 106464463 A | 2/2017 |
| CN | 108631973 A | 10/2018 |

(Continued)

OTHER PUBLICATIONS

Air interface evolution of cellular mobile communication systems LTE, LTE-A, LTE Pro and 5G, Oct. 2017, p. 398-401, The Beijing University of Posts and Telecommunications (BUPT), Beijing, China.

(Continued)

*Primary Examiner* — Yu-Wen Chang
(74) *Attorney, Agent, or Firm* — IP & T GROUP LLP

(57) ABSTRACT

A CA parameter configuration method includes: sending first information to a second device. The first information is used to indicate a target CA parameter configured for a sidelink service, and the sidelink service is a sidelink service between the first device and the second device.

20 Claims, 5 Drawing Sheets

(56) References Cited

U.S. PATENT DOCUMENTS

| | | | | |
|---|---|---|---|---|
| 2020/0252990 | A1* | 8/2020 | Ganesan | H04W 76/14 |
| 2022/0361175 | A1* | 11/2022 | Hou | H04L 5/0091 |
| 2023/0051788 | A1* | 2/2023 | Balasubramanian | H04W 72/0453 |
| 2023/0123622 | A1* | 4/2023 | Wang | H04W 72/044 370/329 |

FOREIGN PATENT DOCUMENTS

| | | | | |
|---|---|---|---|---|
| CN | 109246648 | A | | 1/2019 |
| CN | 109246659 | A * | | 1/2019 ............ H04W 24/10 |
| CN | 109392015 | A | | 2/2019 |
| CN | 109963265 | A | | 7/2019 |
| CN | 110381463 | A | | 10/2019 |
| WO | 2018/175842 | A1 | | 9/2018 |
| WO | 2018/227985 | A1 | | 12/2018 |
| WO | 2019/023857 | A1 | | 2/2019 |
| WO | 2019/061194 | A1 | | 4/2019 |
| WO | 2019/098781 | A1 | | 5/2019 |

OTHER PUBLICATIONS

The First Office Action of Priority Application No. CN 201910663387.1 issued by the Chinese Patent Office on Mar. 16, 2021.

The Second Office Action of Priority Application No. CN 201910663387.1 issued by the Chinese Patent Office on Aug. 17, 2021.

International Search Report and Written Opinion of International Application No. PCT/CN2020/100002 issued by the Chinese Patent Office on Aug. 27, 2020.

Examination Report for the Indian Patent Application No. 202217002785 issued by the Indian Patent Office on Apr. 11, 2022.

Extended European Search Report for the European Patent Application No. 20843936.4 issued by the European Patent Office on Aug. 16, 2022.

* cited by examiner

CARRIER AGGREGATION PARAMETER CONFIGURATION METHOD, DEVICE, AND SYSTEM

CROSS-REFERENCE OF RELATED APPLICATIONS

This application is a Bypass Continuation Application of PCT/CN2020/100002 filed on Jul. 2, 2020, which claims priority to Chinese Patent Application No. 201910663387.1 filed on Jul. 22, 2019, which are incorporated herein by reference in their entirety.

TECHNICAL FIELD

Embodiments of this disclosure relate to the field of communications technologies, and in particular, to a carrier aggregation (CA) parameter configuration method, a device, and a system.

BACKGROUND

Sidelink is a technology of directly transmitting data between user equipments (UE) without a network device.

Currently, in long term evolution (LTE) sidelink transmission, a single service is generally transmitted on a single carrier to ensure that receive-end UEs with various capabilities can receive services sent by transmit-end UEs. However, in new radio (NR) sidelink transmission, in some scenarios (for example, fast transmission scenario), a single carrier may not be able to meet a transmission rate requirement of a service. As a result, a sidelink transmission rate is relatively low in some scenarios.

SUMMARY

According to a first aspect, an embodiment of this disclosure provides a CA parameter configuration method. The method may be applied to a first device. The method may include: sending first information to a second device, where the first information is used to indicate a target CA parameter configured for a sidelink service, and the sidelink service is a sidelink service between the first device and the second device.

According to a second aspect, an embodiment of this disclosure provides a CA parameter configuration method. The method may be applied to a second device. The method may include: receiving first information sent by a first device, where the first information is used to indicate a target CA parameter configured for a sidelink service, and the sidelink service is a sidelink service between the first device and the second device.

According to a third aspect, an embodiment of this disclosure provides a device. The device may include a sending module. The sending module may be configured to send first information to a second device, where the first information is used to indicate a target CA parameter configured for a sidelink service, and the sidelink service is a sidelink service between the first device and the second device.

According to a fourth aspect, an embodiment of this disclosure provides a device. The device may include a receiving module. The receiving module may be configured to receive first information sent by a first device, where the first information is used to indicate a target CA parameter configured for a sidelink service, and the sidelink service is a sidelink service between the first device and the second device.

According to a fifth aspect, an embodiment of this disclosure provides a device, including a processor, a memory, and a computer program stored in the memory and executable on the processor, where when the computer program is executed by the processor, the steps of the CA parameter configuration method provided in the first aspect are implemented.

According to a sixth aspect, an embodiment of this disclosure provides a device, including a processor, a memory, and a computer program stored in the memory and executable on the processor, where when the computer program is executed by the processor, the steps of the CA parameter configuration method provided in the second aspect are implemented.

According to a seventh aspect, an embodiment of this disclosure provides a communications system. The communications system includes the device in the third aspect and the device in the fourth aspect. Alternatively, the communications system includes the device in the fifth aspect and the device in the sixth aspect.

According to an eighth aspect, an embodiment of this disclosure provides a non-transitory computer-readable storage medium. The non-transitory computer-readable storage medium stores a computer program, and when the computer program is executed by a processor, the steps of the CA parameter configuration method in the first aspect or the second aspect are implemented.

DESCRIPTION OF EMBODIMENTS

Figure 1:
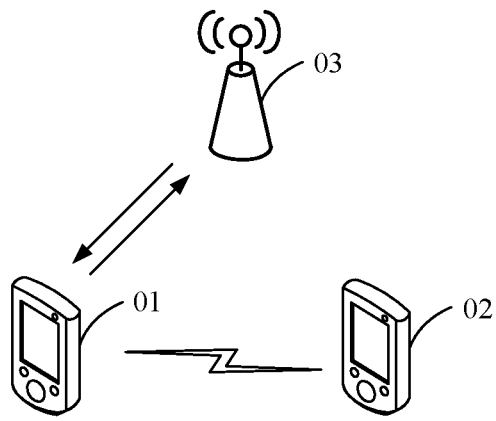
FIG. 1 is a schematic architectural diagram of a communications system according to an embodiment of this disclosure.

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure shall fall within the protection scope of this disclosure.

The term "and/or" in the specification describes an association relationship for describing associated objects and represents that three relationships may exist. For example, A and/or B may represent the following three cases: only A, both A and B, and only B. The symbol "I" in the specification indicates an "or" relationship of associated objects. For example, A/B means A or B.

In the specification and claims of this disclosure, the terms "first", "second", and so on are intended to distinguish between different objects but do not indicate a particular order of the objects. For example, first control signaling, second control signaling, third control signaling, and the like are used to distinguish different control signaling, rather than describe a specified sequence of control signaling.

In the embodiments of this disclosure, terms such as "an example" or "for example" are used to represent an example, an illustration, or a description. Any embodiment or design solution described as "an example" or "for example" in the embodiments of this disclosure shall not be interpreted as being more advantageous than other embodiments or design solutions.

In the descriptions of the embodiments of this disclosure, "plurality" means at least two, unless otherwise specified. For example, a plurality of components means at least two components.

The following describes some terms and nouns included in the embodiments of this disclosure.

CA is a technology introduced in the long term evolution-advanced (LTE-A) system. In the technology, a plurality of component carriers (CC) may be aggregated to increase a transmission bandwidth. A receive-end device may determine, based on a multi-carrier reception capability of the receive-end device, the maximum number of carriers that can be jointly used for transmission.

Sidelink is a technology of directly transmitting data between UEs without a network device. Currently, sidelink transmission mainly includes the following transmission modes: broadcast, groupcast, and unicast.

Vehicle-to-everything (V2X) is a technology enabling a vehicle to communicate with other vehicles and other related devices nearby, and mainly includes various services such as basic security communication, advanced driving, vehicle platooning, and extended sensors.

A base station scheduling mode (Mode 1) is a mode in which a network-side device controls and allocates resources to each UE.

A UE autonomous mode (Mode 2) is a mode in which UE autonomously selects resources.

The embodiments of this disclosure provide a CA parameter configuration method, a device, and a system. A first device may send first information to a second device, where the first information is used to indicate a target CA parameter configured for a sidelink service, and the sidelink service is a sidelink service between the first device and the second device. In this solution, because the first device may send the first information to the second device, the second device may determine, based on the first information, the target CA parameter configured for the sidelink service between the first device and the second device. Therefore, in some scenarios (for example, fast transmission scenario), CA data transmission may be performed between the first device and the second device based on the target CA parameter, to improve a transmission rate and a reception effect for the sidelink service, and improve service experience of a user.

The CA parameter configuration method, device, and system provided in the embodiments of this disclosure may be applied to various communications systems such as NR sidelink and LTE V2X.

The following describes in detail the CA parameter configuration method, device, and system provided in the embodiments of this disclosure by using embodiments and application scenarios thereof with reference to the accompanying drawings provided in the embodiments of this disclosure.

FIG. 1 is a schematic architectural diagram of a communications system according to an embodiment of this disclosure. As shown in FIG. 1, the communications system may include a first device 01, a second device 02, and an access network device 03. A wireless connection may be established between the first device 01 and the access network device 03. A sidelink connection may be established between the first device 01 and the second device 02.

In this embodiment of this disclosure, the first device and the second device each may be UE.

The UE may be a device that provides a user with voice and/or data connectivity, a handheld device with a wired/wireless connection function, or another processing device connected to a wireless modem. The UE may communicate with one or more core network devices through a radio access network (RAN). The UE may be a mobile terminal, such as a mobile phone (or referred to as a "cellular" phone) and a computer with a mobile terminal, or may be a portable, pocket-sized, handheld, computer built-in, or vehicle-mounted mobile apparatus, that exchanges a voice and/or data with the RAN. For example, the UE is a device such as a personal communication service (PCS) phone, a cordless telephone set, a session initiation protocol (SIP) phone, a wireless local loop (WLL) station, or a personal digital assistant (PDA). The UE may also be referred to as a user agent, a terminal device, or the like.

The access network device is a device deployed in the RAN and configured to provide a wireless communication function for the UE. In this embodiment of this disclosure, the access network device may be a base station, and the base station may include a macro base station, a micro base station, a relay station, an access point, and the like in various forms. In systems using different radio access technologies, a device having functions of a base station may have different names. For example, in a 5G system, the device may be referred to as a 5G NodeB (gNB); in a fourth-generation (4G) wireless communications system such as an LTE system, the device may be referred to as an evolved NodeB (eNB); and in a third-generation (3G) mobile communications system, the device may be referred to as a NodeB. It should be noted that, with evolution of communications technologies, the name "base station" may change.

Figure 2:
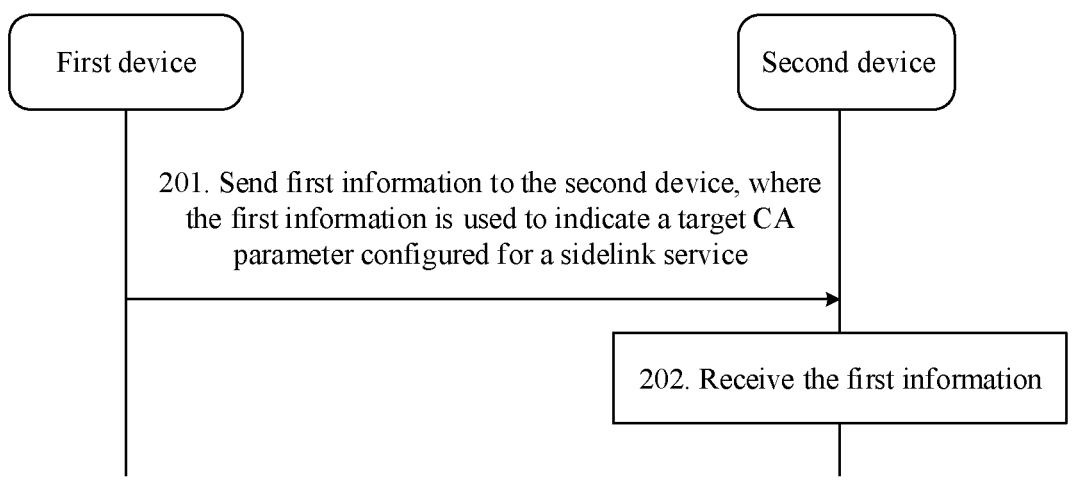
FIG. 2 is a first schematic diagram of a CA parameter configuration method according to an embodiment of this disclosure.

Based on the communications system shown in FIG. 1, an embodiment of this disclosure provides a CA parameter configuration method. As shown in FIG. 2, the CA parameter configuration method may include the following step 201 and step 202.

Step 201: A first device sends first information to a second device, where the first information is used to indicate a target CA parameter configured for a sidelink service.

Step 202: The second device receives the first information.

The sidelink service is a sidelink service between the first device and the second device. To be specific, the sidelink service may be a service transmitted over sidelink between the first device and the second device.

In this embodiment of this disclosure, the first device may be transmit-end UE, and the second device may be receive-end UE.

In this embodiment of this disclosure, a transmission mode used by the first device and the second device may be a sidelink transmission mode.

Optionally, sidelink transmission used by the first device and the second device may be unicast, groupcast, or broadcast. This may be determined based on an actual usage requirement, and is not limited in this embodiment of this disclosure.

Optionally, a communications interface between the first device and the second device may be a PC5 interface, another possible interface, or the like.

Optionally, the target CA parameter may be implemented in Manner 1 or Manner 2.

Manner 1: The target CA parameter may include at least one of: a first carrier configuration list, at least one second carrier configuration list, or first indication information corresponding to each service.

The first carrier configuration list corresponds to at least one service. Each second carrier configuration list corresponds to one service. First indication information corresponding to one service is used to indicate whether CA transmission is to be performed for the one service.

It should be noted that, when the target CA parameter indicated by the first information is implemented in Manner 1, the first information may be carried in PC5 radio resource control (RRC) signaling or other possible information. The PC5 RRC signaling is described in the following embodiments, and details are not described herein.

Manner 2: The target CA parameter may include at least one of: a first carrier activation list, the number of carriers for CA, or second indication information.

The first carrier activation list corresponds to a target service. The number of carriers for CA corresponds to the target service. The second indication information may be used to indicate whether CA transmission is to be performed for the target service. The target service may be all services or a specified service.

It should be noted that, in this embodiment of this disclosure, when the target CA parameter indicated by the first information is implemented in Manner 2, the first information may be carried in a layer 2 (L2) data packet, L2 control signaling, or other possible information. The L2 data packet and L2 control signaling are described in the following embodiments, and details are not described herein.

Optionally, the all services may be all services specific to a pair of destination identifier (destination ID) and source identifier (source ID).

For example, if the L2 data packet or the L2 control signaling carries a target field and a value of the target field is determined collectively based on a pair of destination ID and source ID, the value of the field is used as the number of carriers used for transmission for all services between a pair of UEs.

Optionally, the specified service may be one of all services specific to a pair of destination ID and source ID.

For example, if the L2 data packet or the L2 control signaling carries a target field and a value of the target field is determined based on a logical channel identifier (LCID) of a pair of destination ID and source ID, the value of the LCID may be used as the number of carriers used for transmission for a specified service between a pair of UEs.

In the CA parameter configuration method provided in this embodiment of this disclosure, because the first device may send the first information to the second device, the second device may determine, based on the first information, the target CA parameter configured for the sidelink service between the first device and the second device. Therefore, in some scenarios (for example, a fast transmission scenario), CA data transmission may be performed between the first device and the second device based on the target CA parameter, to improve a transmission rate and a reception effect for the sidelink service, and improve service experience of a user.

Figure 3:
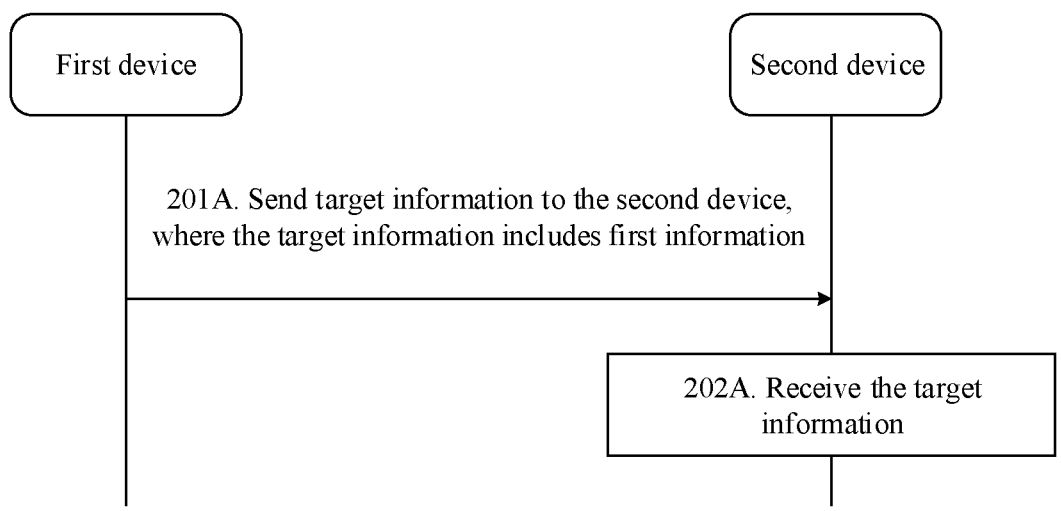
FIG. 3 is a second schematic diagram of a CA parameter configuration method according to an embodiment of this disclosure.

Optionally, with reference to FIG. 2, as shown in FIG. 3, step 201 may be implemented by the following step 201A. Correspondingly, step 202 may be implemented by the following step 202A.

Step 201A: The first device sends the target information to the second device, where the target information includes the first information.

For descriptions of the first information, refer to related descriptions in step 201 and step 202. Details are not described herein again.

Step 202A: The second device receives the target information.

The target information may be any one of: PC5 RRC signaling, an L2 data packet, or L2 control signaling.

It should be noted that, in this embodiment of this disclosure, the PC5 RRC signaling may be in a specific information organization form that is in a standard-specified format and that is identified by using a specific identifier. For example, the PC5 RRC signaling may be identified by using a specific logical channel ID, for example, an LCID. If receive-end UE receives data whose logical channel ID meets the standard-specified format, the receive-end UE may determine that the data is PC5 RRC signaling, and perform parsing based on a PC5 RRC signaling format, to obtain meaningful content in the signaling.

Optionally, the PC5 RRC signaling may be in any one of: one-to-one RRC signaling established between transmit-end UE and receive-end UE for unicast, one-to-one RRC signaling established between transmit-end UE and each receive-end UE for groupcast, one-to-many RRC signaling established between transmit-end UE and a specified number of receive-end UEs for groupcast, or one-to-many RRC signaling established between transmit-end UE and an uncertain number of receive-end UEs for broadcast.

Optionally, L2 may be a media access control (MAC) layer, a radio link control (RLC) layer, or the like.

Optionally, the first information may be carried in an L2 data protocol data unit (PDU).

For example, the first information may be carried in a MAC data PDU, an RLC data PDU, or a packet data convergence protocol (PDCP) data PDU. It should be noted that, an advantage of adding the first information to a MAC data PDU is that the MAC layer is an L2 sublayer closest to a transmission layer, and carrier information is usually carried in a MAC data PDU; and an advantage of adding the first information to an RLC data PDU is that different CA information may be added for each service or each logical channel.

Optionally, the L2 control signaling may be a MAC control element (CE) or other possible L2 control signaling. This may be determined based on an actual usage requirement, and is not limited in this embodiment of this disclosure.

The following clearly describes cases that the target information is PC5 RRC signaling, an L2 data packet, and L2 control signaling by using the following three embodiments.

Embodiment 1

The target information is PC5 RRC signaling.

Optionally, when the target information is PC5 RRC signaling, the target CA parameter (namely, the first information) may be carried in the PC5 RRC signaling. The target CA parameter may include at least one of: a first carrier configuration list, at least one second carrier configuration list, or first indication information corresponding to each service.

To describe each of the target CA parameter more clearly, the following provides examples (1) to (3).

(1) In a Case that the Target CA Parameter Includes the First Carrier Configuration List An optional implementation is as follows: The target CA parameter includes only the first carrier configuration list. In this manner, a carrier configured in the first carrier configuration list may be used for CA transmission for all services by default.

Another optional implementation is as follows: In addition to the first carrier configuration list, the target CA parameter may further include first indication information. The first indication information may be used to indicate that a carrier configured in the first carrier configuration list is used for CA transmission for all services.

For example, assuming that five carriers are configured in the first carrier configuration list and there are two to-be-transmitted services between the first device and the second device, the five carriers may be used for CA transmission for both to-be-transmitted services.

(2) In a Case that the Target CA Parameter Includes at Least One Second Carrier Configuration List An optional implementation is as follows: The target CA parameter includes only the at least one second carrier configuration list. In this manner, a carrier configured in a second carrier configuration list corresponding to each service may be used for CA transmission for the service by default.

Another optional implementation is as follows: In addition to the at least one second carrier configuration list, the target CA parameter may further include at least one piece of second indication information. One second carrier configuration list corresponds to one piece of second indication information. One piece of second indication information may be used to indicate that a carrier configured in a corresponding second carrier configuration list is used for CA transmission for one service.

For example, assuming that a total of five available carriers are configured between the first device and the second device and there are two to-be-transmitted services between the first device and the second device, a carrier 1 and a carrier 2 may be used for CA transmission for a to-be-transmitted service 1, and the carrier 1 to a carrier 5 may be used for CA transmission for a to-be-transmitted service 2.

(3) In a Case that the Target CA Parameter Includes at Least One Second Carrier Configuration List and First Indication Information Corresponding to Each Service For example, assuming that there are two to-be-transmitted services between the first device and the second device, based on first indication information corresponding to a to-be-transmitted service 1 and a second carrier configuration list corresponding to the to-be-transmitted service 1, it may be learned that the to-be-transmitted service 1 is allowed to be transmitted by using a carrier 1; and based on first indication information corresponding to a to-be-transmitted service 2 and a second carrier configuration list corresponding to the to-be-transmitted service 2, it may be learned that the to-be-transmitted service 2 is allowed to be transmitted by using the carrier 1 to a carrier 5.

Optionally, the PC5 RRC signaling may be preconfigured or agreed upon in advance. For example, transmission may be performed on a common carrier; or a specific carrier may be specified in a list of carriers allowing service transmission indicated by a higher layer, for example, a default carrier is explicitly indicated; or it is agreed upon that a carrier with a lowest frequency or a highest frequency is used for transmission. It can be understood that, during transmission of the PC5 RRC signaling, if receive-end UE is not sure of a capability or reception, for example, in a groupcast case, a reception effect can be improved by preconfiguring or agreeing upon in advance a carrier on which the PC5 RRC signaling is to be transmitted.

It can be understood that configuration between a service and a carrier has been completed after the second device receives the PC5 RRC signaling from the first device. However, based on a characteristic of service data arrival, not all of carriers corresponding to the target CA parameter need to be jointly used to transmit a service at all moments. For example, when a service volume is relatively low, a service may be transmitted by using some of the carriers corresponding to the target CA parameter; or when a service volume is relatively high, a service may be transmitted by using all of the carriers corresponding to the target CA parameter. Therefore, this embodiment of this disclosure further provides the following method for activating or deactivating a carrier corresponding to the target CA parameter.

Figure 4:
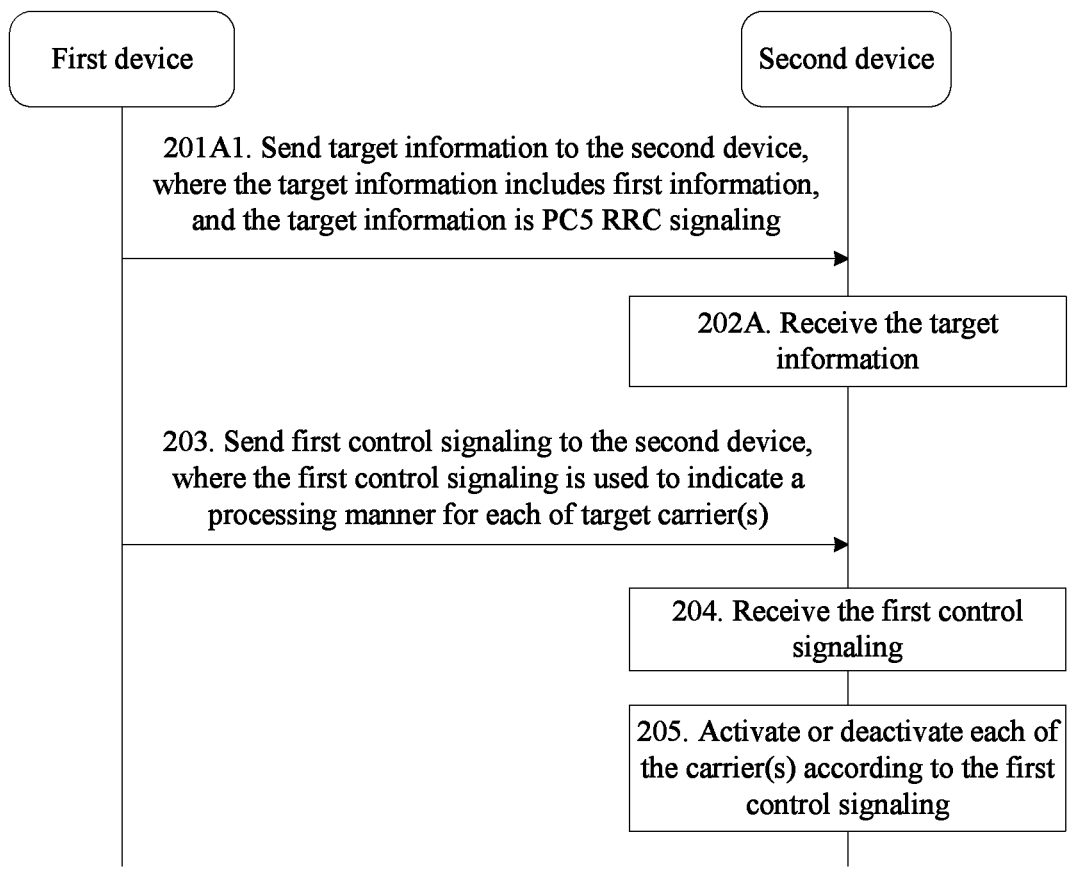
FIG. 4 is a third schematic diagram of a CA parameter configuration method according to an embodiment of this disclosure.

With reference to FIG. 3, as shown in FIG. 4, in a case that the target information is PC5 RRC signaling, step 201A may be implemented by the following step 201A1. In addition, after step 201A1, the CA parameter configuration method provided in this embodiment of this disclosure may further include the following step 203 to step 205.

Step 201A1: The first device sends target information to the second device, where the target information includes the first information, and the target information is PC5 RRC signaling.

Step 203: The first device sends first control signaling to the second device, where the first control signaling is used to indicate a processing manner for each of target carrier(s).

Step 204: The second device receives the first control signaling.

Step 205: The second device activates or deactivates each of the carrier(s) according to the first control signaling.

The processing manner may be activation or deactivation. The target carrier(s) may be carriers in the carriers corresponding to the target CA parameter.

Optionally, the first control signaling may be L2 control signaling, and may be a MAC CE.

Optionally, the target carrier(s) may be all or some of the carriers corresponding to the target CA parameter.

Optionally, if the first information in the target information is further used to indicate a primary carrier of CA, the target carrier(s) may be carriers in the carriers corresponding to the target CA parameter other than the primary carrier; or if the first information in the target information does not indicate primary carrier of CA, the target carrier(s) are all of the carriers corresponding to the target CA parameter.

For example, the PC5 RRC signaling (namely, the target information) sent by the first device to the second device may explicitly indicate a special carrier, and the special carrier may be a primary carrier. A characteristic of the primary carrier lies in that the primary carrier is always in an active state. Therefore, the carriers in the carriers corresponding to the target CA parameter other than the primary carrier may serve as secondary carriers, and the secondary carriers may be activated or deactivated by using the MAC CE (namely, the first control signaling).

Optionally, in a case that the first information is further used to indicate the primary carrier of CA, after the first device sends the PC5 RRC signaling (namely, the target information) to the second device and the configuration between the service and the carrier is completed, an initial state of the secondary carrier may be an active state or an inactive state.

Optionally, in a case that the first information does not indicate primary carrier of CA, when initial configuration is completed based on the PC5 RRC signaling, at least one of the carriers corresponding to the target CA parameter is in an active state.

Optionally, carrier information carried in the PC5 RRC signaling (namely, the target information) may include at least one of: a center frequency, bandwidth, a cell ID, or a physical layer cell ID.

Optionally, that the second device activates or deactivates each of the carrier(s) according to the first control signaling may include: The carriers may be sequentially numbered according to sequential positions in which the carrier appears in the PC5 RRC signaling (namely, the target information), and a carrier corresponding to the number is activated or deactivated.

For example, the first information is further used to indicate the primary carrier of CA, and the first control signaling is a MAC CE. It is assumed that five carriers are configured in the PC5 RRC signaling, and four secondary carriers other than the primary carrier respectively correspond to four bits of the MAC CE in a bitmap form. For each location of the four bits, if a value of a location is 1, it indicates that a carrier corresponding to the location is to be activated; or if a value of a location is 0, it is used to indicate that a carrier corresponding to the location is to be deactivated. In this way, the second device may activate or deactivate a carrier in each location according to a value of each location of the four bits. It can be understood that, such carrier numbering manner can simplify the first control signaling and reduce overheads.

Optionally, if the second device has activated a carrier according to the first control signaling, the second device may receive data, perform signaling feedback, perform corresponding measurement, and the like on the carrier. If the second device has deactivated a carrier according to the first control signaling, the second device may give up listening to the carrier.

It can be understood that, in a case that the transmission mode between the first device and the second device is unicast, the first device and the second device are in a one-to-one relationship, and both PC5 RRC signaling and MAC CE signaling have feedbacks, for example, an RLC acknowledgement (ACK) and a MAC hybrid automatic repeat request (HARQ) ACK. Therefore, the first device and the second device may reach an agreement on a carrier configuration and a carrier processing manner.

However, in a case that the transmission mode between the first device and the second device is groupcast or broadcast, receive-end UE may dynamically change, that is, UE may constantly quit or join. To enable receive-end UE that has newly joined to obtain the carrier configuration and the carrier processing manner, a first possible implementation is as follows: The first device sends the carrier configuration in a unicast form to the receive-end UE that has newly joined, and the first device periodically sends the carrier processing manner to the receive-end UE that has newly joined. A second possible implementation is as follows: The first device periodically sends the carrier configuration and the carrier processing manner to the receive-end UE that has newly joined.

The following describes the second possible implementation by using an example in which the second device is the receive-end UE that has newly joined. Optionally, step 201A1 may be implemented by the following step 201A11, and step 203 may be implemented by the following step 203A.

Step 201A11: The first device periodically sends target information to the second device, where the target information includes the first information, and the target information is PC5 RRC signaling.

Step 203A: The first device periodically sends first control signaling to the second device, where the first control signaling is used to indicate a processing manner for each of target carrier(s).

For descriptions of the target information, the first information, and the first control signaling, refer to related descriptions in the foregoing embodiments. Details are not described herein again.

Optionally, the first device may periodically send the target information to the second device based on a first period; or the first device may periodically send the target information to the second device based on a second period. A length of the first period may be the same as or different from that of the second period. This may be determined based on an actual usage requirement.

Optionally, before obtaining the target information and the first control signaling periodically sent by the first device, receive-end UE that has newly joined may perform multi-carrier blind detection to obtain service data.

In the CA parameter configuration method provided in this embodiment of this embodiment, because receive-end UE may dynamically change, the first device periodically sends the target information and the first control signaling to receive-end UE that has newly joined, so that the receive-end UE that has newly joined may obtain the carrier configuration and the carrier processing manner, and better receive data based on a multi-carrier reception capability of the receive-end UE.

Embodiment 2

The target information is an L2 data packet.

It should be noted that the PC5 RRC signaling provided in Embodiment 1 is more suitable for unicast, because transmit-end UE and receive-end UE are in a one-to-one mapping manner in unicast. In this mapping manner, status synchronization between the transmit-end UE and the receive-end UE can be well maintained. However, for broadcast and groupcast, because receive-end UE may dynamically change, for example, receive-end UE may dynamically join or quit data reception, the PC5 RRC signaling cannot well ensure that receive-end UE that newly joins can obtain a carrier configuration and a carrier processing manner in a timely manner. Therefore, in this embodiment of this disclosure, an L2 data packet may be used to carry the first information, so that receive-end UE that newly joins can obtain a carrier configuration and a carrier processing manner in a timely manner.

Optionally, the first information may be carried in a header of an L2 data packet over PC5 interface.

Optionally, when the target information is an L2 data packet, the target CA parameter may be configured by a base station or the first device (namely, the transmit-end UE).

Optionally, when the target information is an L2 data packet, the target CA parameter (namely, the first information) may be carried in the L2 data packet, or the target CA parameter may be indicated by the first information in the L2 data packet.

Optionally, when the target information is an L2 data packet, the first information may occupy reserved R bits in R16 NR-V2X, or a bit or a byte may be added. For example, CA transmission is introduced in R17, and the reserved R bits in the R16 may be directly used.

Optionally, when the target information is an L2 data packet, the target CA parameter may include at least one of: a first carrier activation list, the number of carriers for CA, or second indication information.

To describe each of the target CA parameter more clearly, the following provides examples (1) to (3).

(1) In a Case that the Target CA Parameter Includes the Second Indication Information Optionally, the second indication information may be a value of a bit in the L2 data packet, and the value of the bit may be used to indicate whether CA transmission is to be performed for the target service.

Optionally, when the value of the bit is 1, it indicates that CA transmission is enabled for the target service; or when the value of the bit is 0, it indicates that single-carrier transmission is to be performed for the target service. Alternatively, when the value of the bit is 1, it indicates that single-carrier transmission is to be performed for the target service; or when the value of the bit is 0, it indicates that CA transmission is enabled for the target service.

For example, in a header of an RLC data PDU (or a PDCP data PDU), one bit may be used to indicate whether CA transmission is to be performed for the target service. For example, when a value of the bit is 1, it indicates that CA transmission is enabled for a service or a logical channel corresponding to an RLC or PDCP entity; or when a value of the bit is 0, it indicates that single-carrier transmission is to be performed.

For example, in a header of a MAC data PDU, based on a pair of destination ID and source ID, one bit may be used to indicate whether CA transmission is to be performed for the target service. For example, when a value of the bit is 1, it indicates that CA transmission is enabled for all services between the pair of destination ID and source ID; or when a value of the bit is 0, it indicates that single-carrier transmission is to be performed.

For example, in a header of a MAC data PDU, based on a pair of destination ID and source ID, for each LCID, one bit may be used to indicate whether CA transmission is to be performed for the target service. For example, when a value of the bit is 1, it indicates that CA transmission is enabled for a logical channel between the pair of destination ID and source ID; or when a value of the bit is 0, it indicates that single-carrier transmission is to be performed.

Optionally, when the second indication information indicates that CA transmission is to be performed for the target service, frequency configuration information needs to be met. For example, when the first device initiates a service, a V2X higher layer notifies the first device of attribute information of the service, for example, a QoS requirement of the service, stream information of the service, and information about a frequency at which the service is allowed to be transmitted. If the information about a frequency at which the service is allowed to be transmitted includes a plurality of frequencies and transmission is allowed to be performed simultaneously at the plurality of frequencies, the first device is allowed to perform CA transmission when sending the service.

Optionally, when the first device initiates a service, a resource allocation mode used by the first device may be a Mode 1 or a Mode 2.

A first optional implementation is as follows:

If the resource allocation mode used by the first device is the Mode 1, a network-side device controls whether CA transmission is to be performed for the service.

For example, when the network-side device explicitly or implicitly indicates to activate CA transmission, the first device may add 1 to a header of an L2 data PDU over PC5 interface; or when the network-side device explicitly or implicitly indicates single-carrier transmission, the first device may add 0 to a header of an L2 data PDU over PC5 interface.

A second optional implementation is as follows:

If the resource allocation mode used by the first device is the Mode 2, the first device autonomously controls whether CA transmission is to be performed for the service.

For example, when a service volume increases (for example, exceeds a threshold), a service transmission delay increases (for example, exceeds a threshold), or a single carrier no longer meet a service transmission requirement (a determining threshold is configured, preconfigured, or standard-specified), the first device may enable CA transmission for the service and add 1 to a header of an L2 data PDU over PC5 interface; otherwise, the first device may add 0 to a header of an L2 data PDU over PC5 interface.

Optionally, a condition for switching transmission between the first device and the second device from CA transmission to single-carrier transmission may be network-configured, network-preconfigured, or standard-specified. When the first device determines that the condition for switching from CA transmission to single-carrier transmission is met, the first device may add, to a header of an L2 data PDU over PC5 interface, information indicating single-carrier transmission.

It should be noted that adding 1 or 0 by the first device to the L2 data packet is a relatively semi-persistent indication, that is, each state indicates lasting for a period of time, but does not indicate transmission of a current data packet. To be specific, in a current transmission time interval (TTI), transmission is not necessarily simultaneously performed on a plurality of carriers. This depends on an actual case of obtaining resources. However, in the current period of time, the first device attempts to perform transmission simultaneously on a plurality of carriers, to obtain a relatively high throughput.

(2) In a Case that the Target CA Parameter Includes the Number of Carriers for CA Optionally, the number of carriers for CA may be indicated by a value of a target field in the L2 data packet.

Optionally, the target CA parameter may include only the number of carriers for CA, or the target CA parameter may include the number of carriers for CA and the second indication information.

For example, in the manner in which the target CA parameter includes only the number of carriers for CA, each data packet may carry the target field. If a value of the target field is determined collectively based on a pair of destination ID and source ID, the value of the target field may indicate the number of carriers for CA for all services between a pair of UEs. If a value of the target field is determined based on one LCID of a pair of destination ID and source ID, the value of the target field may indicate the number of carriers for CA for one service between a pair of UEs. In addition, a value range of the number of carriers for CA is limited by a maximum capability of UE. For example, if a standard defines that aggregation of a maximum of eight carriers can meet a requirement, a field of the number of carriers for CA may be a 3-bit binary header field, and values of 000 to 111 respectively indicate to use 1 to 8 carriers for aggregate transmission.

For example, in the manner in which the target CA parameter includes the number of carriers for CA and the second indication information, when the second indication information indicates single-carrier transmission, a value of a bit is 0, and in this case, the number of carriers for CA does not need to be limited; or when the second indication information indicates CA transmission, a value of a bit is 1, and in this case, the number of carriers for CA needs to be limited. For example, the field of the number of carriers for CA may be a 2-bit binary header field, and values of 00 to 11 respectively indicate to use 1 to 4 carriers for aggregate transmission. For another example, the 2-bit binary header field may have a new meaning, and the values of 00 to 11 may respectively indicate to use 2 to 5 carriers for aggregate transmission.

It should be noted that, in the manner in which the target CA parameter includes the number of carriers for CA and the second indication information, an action scope of the target field may be all services based on a pair of UEs, or a specified service (that is, CA parameters of services may be different).

Optionally, when the first device performs CA transmission, frequency configuration information needs to be met. For example, when the first device initiates a service, a V2X higher layer notifies the first device of attribute information of the service, for example, a QoS requirement of the service, stream information of the service, and information about a frequency at which the service is allowed to be transmitted. If the information about a frequency at which the service is allowed to be transmitted includes a plurality of frequencies and transmission is allowed to be performed simultaneously at the plurality of frequencies, the first device is allowed to perform CA transmission when sending the service, and adds, to the L2 data packet, the first information used to indicate the number of carriers for CA.

Optionally, when the first device initiates a service, a resource allocation mode used by the first device may be a Mode 1 or a Mode 2.

A first optional implementation is as follows:

If the resource allocation mode used by the first device is the Mode 1, a network-side device controls the number of carriers for CA.

For example, when the network-side device explicitly or implicitly indicates to activate CA transmission, the first device may add, to a header of an L2 data PDU over PC5 interface, the first information used to indicate the number of carriers for CA; or when the network-side device explicitly or implicitly indicates single-carrier transmission, the first device may not add information to a header of an L2 data PDU over PC5 interface, or may add information indicating single-carrier transmission.

A second optional implementation is as follows:

If the resource allocation mode used by the first device is the Mode 2, the first device autonomously controls the number of carriers for CA.

For example, when a service volume increases (for example, exceeds a threshold), a service transmission delay increases (for example, exceeds a threshold), or a single carrier no longer meet a service transmission requirement (a determining threshold is configured, preconfigured, or standard-specified), the first device may enable CA transmission for the service, select the number of carriers for CA according to a preset rule, and add, to a header of an L2 data PDU over PC5 interface, the first information used to indicate the number of carriers for CA; otherwise, the first device may not add information to a header of an L2 data PDU over PC5 interface, or may add information indicating single-carrier transmission.

Optionally, a condition for switching transmission between the first device and the second device from CA transmission to single-carrier transmission may be network-configured, preconfigured, or standard-specified. When the first device determines that the condition for switching from CA transmission to single-carrier transmission is met, the first device may add, to a header of an L2 data PDU over PC5 interface, information indicating single-carrier transmission.

It should be noted that adding the number of carriers for CA by the first device to the L2 data packet is a relatively semi-persistent indication, that is, each state indicates lasting for a period of time, but does not indicate transmission of a current data packet. To be specific, in a current transmission time interval (TTI), transmission is not necessarily simultaneously performed on a plurality of carriers. This depends on an actual case of obtaining resources. However, in the current period of time, the first device attempts to perform transmission simultaneously on a plurality of carriers, to obtain a relatively high throughput.

It can be understood that, compared with that the target CA parameter includes the second indication information, when the target CA parameter includes the number of carriers for CA, a CA configuration parameter for CA transmission may be detailed, but overheads are increased.

(3) In a Case that the Target CA Parameter Includes the First Carrier Activation List Optionally, the first carrier activation list may be indicated by a value of a target field in the L2 data packet.

Optionally, the target CA parameter may include only the first carrier activation list, or the target CA parameter may include the first carrier activation list and the second indication information.

For example, in the manner in which the target CA parameter includes only the first carrier activation list, each data packet may carry the target field. If a value of the target field is determined collectively based on a pair of destination ID and source ID, the value of the target field may indicate the first carrier activation list for all services between a pair of UEs. If a value of the target field is determined based on one LCID of a pair of destination ID and source ID, the value of the target field may indicate the first carrier activation list for one service between a pair of UEs.

For example, in the manner in which the target CA parameter includes the first carrier activation list and the second indication information, when the second indication information indicates single-carrier transmission, a value of a bit is 0, and in this case, the first carrier activation list does not need to be limited; or when the second indication information indicates CA transmission, a value of a bit is 1, and in this case, the first carrier activation list needs to be limited.

It should be noted that, in the manner in which the target CA parameter includes the first carrier activation list and the second indication information, an action scope of the target field may be all services based on a pair of UEs, or a specified service (that is, CA parameters of services may be different).

Optionally, because overheads are relatively large when the L2 data packet carries an information list of carriers, an information list (for example, a frequency, bandwidth, and a cell ID) used for V2X CA transmission may be broadcast in a cell system information block (SIB), and whether a carrier is used for CA transmission is indicated in the L2 data packet based on a carrier sequence in the SIB. For example, information of eight carriers is broadcast in the SIB, and carriers 1 to 8 sequentially appear in signaling. In this case, a header field of one byte in the L2 data packet may serve as an indication of the first carrier activation list (namely, the first information), and bits 0 to 7 of the byte respectively correspond to the carriers 1 to 8 in the SIB in sequence. When a value of a bit of the byte is 1, it indicates that a carrier corresponding to the bit participates in transmission. When a value of a bit of the byte is 0, it indicates that a carrier corresponding to the bit does not participate in transmission.

For example, assuming that a value of the byte is 01001000, it indicates that a carrier 2 and a carrier 5 in a carrier list of the SIB participate in transmission, and other carriers do not participate in transmission. Alternatively, assuming that a value of the byte is 00010010, it indicates that a carrier 4 and a carrier 7 in the carrier list of the SIB participate in transmission, and other carriers do not participate in transmission.

Optionally, when the first device performs CA transmission, frequency configuration information needs to be met. For example, when the first device initiates a service, a V2X higher layer notifies the first device of attribute information of the service, for example, a QoS requirement of the service, stream information of the service, and information about a frequency at which the service is allowed to be transmitted. If the information about a frequency at which the service is allowed to be transmitted includes a plurality of frequencies and transmission is allowed to be performed simultaneously at the plurality of frequencies, the first device is allowed to perform CA transmission when sending the service, and adds, to the L2 data packet, the first information used to indicate the first carrier activation list.

Optionally, when the first device initiates a service, a resource allocation mode used by the first device may be a Mode 1 or a Mode 2.

A first optional implementation is as follows:

If the resource allocation mode used by the first device is the Mode 1, a network-side device controls the carrier activation list.

For example, when the network-side device explicitly or implicitly indicates to activate CA transmission, the first device may add, to a header of an L2 data PDU over PC5 interface, the first information used to indicate the first carrier activation list; or when the network-side device explicitly or implicitly indicates single-carrier transmission, the first device may not add information to a header of an L2 data PDU over PC5 interface, or may add information indicating single-carrier transmission.

A second optional implementation is as follows:

If the resource allocation mode used by the first device is the Mode 2, the first device autonomously controls the carrier activation list.

For example, when a service volume increases (for example, exceeds a threshold), a service transmission delay increases (for example, exceeds a threshold), or a single carrier no longer meet a service transmission requirement (a determining threshold is configured, preconfigured, or standard-specified), the first device may enable CA transmission for the service, select the first carrier activation list according to a preset rule, and add, to a header of an L2 data PDU over PC5 interface, the first information used to indicate the first carrier activation list; otherwise, the first device may not add information to a header of an L2 data PDU over PC5 interface, or may add information indicating single-carrier transmission.

Optionally, a condition for switching transmission between the first device and the second device from CA transmission to single-carrier transmission may be network-configured, preconfigured, or standard-specified. When the first device determines that the condition for switching from CA transmission to single-carrier transmission is met, the first device may add, to a header of an L2 data PDU over PC5 interface, information indicating single-carrier transmission.

It should be noted that adding the first carrier activation list by the first device to the L2 data packet is a relatively semi-persistent indication, that is, each state indicates lasting for a period of time, but does not indicate transmission of a current data packet. To be specific, in a current transmission time interval (TTI), transmission is not necessarily simultaneously performed on a plurality of carriers. This depends on an actual case of obtaining resources. However, in the current period of time, the first device attempts to perform transmission simultaneously on a plurality of carriers, to obtain a relatively high throughput.

It can be understood that, compared with that the target CA parameter includes the second indication information, when the target CA parameter includes the first carrier activation list, a CA configuration parameter for CA transmission may be detailed, but overheads are increased.

Figure 5:
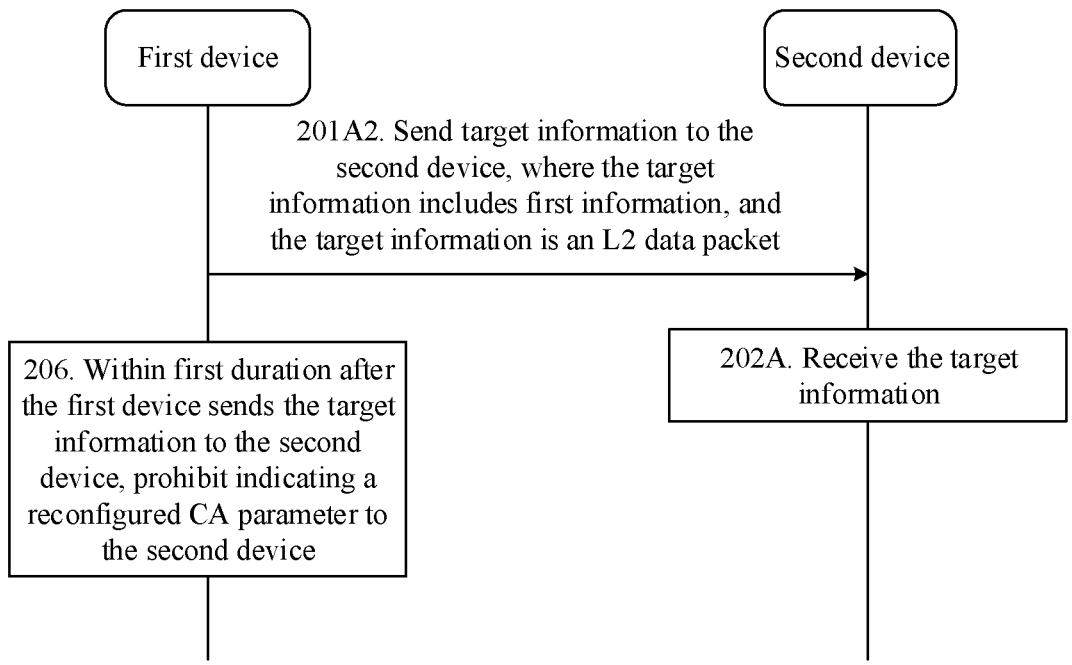
FIG. 5 is a fourth schematic diagram of a CA parameter configuration method according to an embodiment of this disclosure.

In this embodiment of this disclosure, to avoid a confusion period in which the second device does not clearly understand a CA configuration due to disorder of data packets, the indication of whether CA transmission is to be performed for the target service, the indication of the number of carriers for CA, and the indication of the carrier activation list should not change excessively frequently. With reference to FIG. 3, as shown in FIG. 5, in a case that the target information is an L2 data packet, step 201A may be implemented by the following step 201A2. In addition, after step 201A2, the CA parameter configuration method provided in this embodiment of this disclosure may further include the following step 206.

Step 201A2: The first device sends target information to the second device, where the target information includes the first information, and the target information is an L2 data packet.

Step 206: Within first duration after the first device sends the target information to the second device, the first device is prohibited from indicating a reconfigured CA parameter to the second device.

Optionally, the first duration may be configured, preconfigured, or standard-specified.

For example, after the first device sends the L2 data packet including the first information to the second device, if the target CA parameter indicated by the first information is configured for the first time or CA indication information has changed, the first device may enable a timer for prohibiting a further change. During running of the timer, the CA indication information is prohibited from changing. To be specific, the first device is prohibited from indicating a reconfigured CA parameter to the second device. For example, the first device is prohibited from indicating, to the second device, a reconfigured indication of whether CA transmission is to be performed for the target service, the reconfigured number of carriers for CA, or a reconfigured carrier activation list. When timing duration of the timer exceeds the first duration, the CA indication information is allowed to change again, that is, the first device is allowed to indicate a reconfigured CA parameter to the second device.

In the CA parameter configuration method provided in this embodiment of this disclosure, within the first duration after the first device sends the target information to the second device, the first device is prohibited from indicating a reconfigured CA parameter to the second device. This can prevent the indication of whether CA transmission is to be performed for the target service, the indication of the number of carriers for CA, and the indication of the carrier activation list from frequently changing, thereby avoiding a confusion period in which the second device does not clearly understand a CA configuration due to disorder of data packets, and ensuring that the second device can properly receive a service.

Optionally, in a case that the target information is an L2 data packet, after step 202A, the CA parameter configuration method provided in this embodiment of this disclosure may further include the following step 207.

Step 207: The second device receives a service based on capability information of the second device and the target CA parameter.

The capability information of the second device may be used to indicate a multi-carrier reception capability of the second device.

Optionally, step 207 may be implemented by the following step (a1) or (b1).

(a1) In a case that the target CA parameter indicates that a first service is transmitted on a first carrier, the second device receives the first service on the first carrier, where the first carrier is a single carrier.

(b1) In a case that the target CA parameter indicates that a first service is transmitted on M second carriers, if the multi-carrier reception capability of the second device is within a capability range indicated by the target CA parameter, the second device receives the first service on the M second carriers; or if the multi-carrier reception capability of the second device is beyond a capability range indicated by the target CA parameter, the second device gives up receiving the first service on the M second carriers, where M is an integer greater than 1.

For example, if the first information in the L2 data packet received by the second device indicates single-carrier transmission, the second device may receive the first service on the first carrier indicated by the first information.

For example, if the first information in the L2 data packet received by the second device indicates CA transmission and the multi-carrier reception capability of the second device is within the capability range indicated by the target CA parameter, the second device may attempt to receive the first service on the M second carriers. For the same destination ID/source ID and the same LCID, the second device may determine that data received on a plurality of carriers is data of one service, and send the data to one RLC/PDCP entity for processing.

For example, if the first information in the L2 data packet received by the second device indicates CA transmission but the multi-carrier reception capability of the second device is beyond the capability range indicated by the target CA parameter (for example, the second device has only a single-carrier reception capability, or it is learned from a V2X higher layer that all carriers on which a service is allowed to be sent go beyond the multi-carrier reception capability of the second device), the second device may give up receiving the first service on the M second carriers.

Optionally, because data packets may be out of order within a period of time after the CA indication information has changed, the second device may continue to perform multi-carrier listening for a period of time after the CA indication information has changed. To be specific, after the "receiving the first service on the M second carriers" in step (b1), the CA parameter configuration method provided in this embodiment of this disclosure may further include the following steps (c1) to (e1).

(c1) The second device receives target indication information sent by the first device, where the target indication information is used to indicate that a second service is transmitted on a third carrier, and the third carrier is a single carrier.

(d1) Within second duration after the target indication information is received, the second device continues to receive the first service on the M second carriers.

(e1) After the second duration, the second device stops receiving the first service on the M second carriers, and starts to receive the second service on the third carrier.

Optionally, the second duration may be a configured, preconfigured, or standard-specified timer length of the timer.

It should be noted that steps (c1) to (e1) are specific to a case of switching from a multi-carrier mode to a single-carrier mode. When the single-carrier mode is switched to the multi-carrier mode, the second device may immediately perform multi-carrier listening without waiting.

In the CA parameter configuration method provided in this embodiment of this disclosure, the second device may continue to perform multi-carrier listening for a period of time when the multi-carrier mode is switched to the single-carrier mode, to avoid incomplete service data reception due to disorder of data packets.

Embodiment 3

The target information is L2 control signaling.

It should be noted that Embodiment 2 describes a manner in which the L2 data packet is used to carry the first information. An advantage lies in that UE that newly joins reception can obtain the first information when receiving the data packet. However, data format compatibility and overhead problems may occur. Therefore, in the CA parameter configuration method provided in this embodiment of this disclosure, L2 control signaling may be used to carry the first information, to resolve the data format compatibility problem and reduce overheads.

Optionally, when the target information is L2 control signaling, the L2 control signaling may be a MAC CE.

Optionally, when the target information is L2 control signaling, the target CA parameter may be configured by a base station or the first device.

Optionally, when the target information is L2 control signaling, the target CA parameter (namely, the first information) may be carried in the L2 control signaling, or the target CA parameter may be indicated by the first information in the L2 control signaling.

Optionally, when the target information is L2 control signaling, the first information may occupy reserved R bits in R16 NR-V2X, or a bit or a byte may be added. For example, CA transmission is introduced in R17, and the reserved R bits in the R16 may be directly used.

Optionally, when the target information is L2 control signaling, the target CA parameter may include at least one of: a first carrier activation list, the number of carriers for CA, or second indication information.

It should be noted that, for descriptions of the target CA parameter being the first carrier activation list, the target CA parameter being the number of carriers for CA, and the target CA parameter being the second indication information when the target information is L2 control signaling, reference may be made to related descriptions in Embodiment 2. Details are not described herein again.

Optionally, when the target information is L2 control signaling, to ensure that UE that newly joins can obtain the latest CA parameter in a timely manner, a manner of sending the L2 control signaling may be an event triggered manner or a periodically triggered manner.

In the event triggered manner:

After step 201A, the CA parameter configuration method provided in this embodiment of this disclosure may further include the following step 208.

Step 208: In a case that the target CA parameter has changed, the first device immediately sends second control signaling to the second device, where the second control signaling includes second information, the second information is used to indicate a reconfigured target CA parameter, and the second control signaling is L2 control signaling.

For example, when the target CA parameter has changed, the first device may immediately send a new MAC CE to the second device; or when the target CA parameter remains unchanged, the first device does not need to send a MAC CE.

Optionally, the reconfigured target CA parameter indicated in the second information needs to meet a frequency configuration information sent by a network-side device to the first device. For details, refer to related descriptions in Embodiment 2. Details are not described herein again.

Optionally, when the first device initiates a service, a resource allocation mode used by the first device may be a Mode 1 or a Mode 2. For example, if the resource allocation mode used by the first device is the Mode 1, the network-side device controls a target CA parameter of the service; or if the resource allocation mode used by the first device is the Mode 2, the first device autonomously controls a target CA parameter for the service. For details, refer to related descriptions in Embodiment 2. Details are not described herein again.

In the periodically triggered manner:

After step 201A, the CA parameter configuration method provided in this embodiment of this disclosure may further include the following step 209 or step 210.

Step 209: In a case that the target CA parameter has changed, the first device immediately sends second control signaling to the second device, where the second control signaling includes second information, the second information is used to indicate a reconfigured target CA parameter, and the second control signaling is L2 control signaling.

Step 210: In a case that the target CA parameter remains unchanged, the first device periodically sends third control signaling to the second device, where the third control signaling includes the first information, and the third control signaling is L2 control signaling.

Optionally, after step 209, the CA parameter configuration method provided in this embodiment of this disclosure may further include step 211.

Step 211: In a case that the target CA parameter remains unchanged, the first device periodically sends second control signaling to the second device.

Optionally, the second control signaling and the third control signaling may be MAC CEs.

Optionally, a period length, a period starting point, and a period offset location for the periodic sending may be configured by the network-side device, preconfigured, or standard-specified.

For example, after the first device sends the first information for the first time, the first device may restart a periodic timer. During running of the periodic timer, if the target CA parameter remains unchanged, after the periodic timer expires, the first device may send the first information to the second device again, and restart the periodic timer after sending the first information again, that is, the first device may periodically send the third control signaling including the first information to the second device.

However, during running of the periodic timer, if the target CA parameter has changed, the first device may immediately send the second control signaling including the second information to the second device, and immediately restart the periodic timer after sending the second control signaling. Then, after the restarted periodic timer expires, if the target CA parameter remains unchanged, the first device may periodically send the second control signaling to the second device. However, during running of the restarted periodic timer, if the target CA parameter changes again, the first device may immediately send control signaling including new configuration information to the second device, and immediately restart the periodic timer again after sending the control signaling.

It should be noted that the periodically triggered manner provides an optional implementation for this embodiment of this disclosure, but does not constitute a limitation. It can be understood that, in actual implementation, L2 control signaling including CA configuration information and a data packet may be sent together, that is, the L2 control signaling is sent together with the data packet only when there is data packet to be sent. However, if no data packet is currently to be sent, sending of the L2 control signaling may be delayed.

Optionally, when the target information is L2 control signaling, after step 202A, the CA parameter configuration method provided in this embodiment of this disclosure may further include the following step 212.

Step 212: The second device determines, based on the target information, whether to update a target CA parameter stored on the second device.

Optionally, a value tag field may be introduced in a MAC CE, and a value of the value tag field may be used to indicate whether the target CA parameter is reconfigured.

For example, in a case that the first device sends the target information to the second device, the target information may further include a value tag field (namely, an indication field), and the indication field in the target information may be used to indicate whether the target CA parameter is reconfigured.

In a case that the first device sends the second control signaling to the second device, the second control signaling may further include a value tag field (namely, an indication field), and the indication field in the second control signaling may be used to indicate whether the target CA parameter is reconfigured.

In a case that the first device sends the third control signaling to the second device, the third control signaling may further include a value tag field (namely, an indication field), and the indication field in the third control signaling may be used to indicate whether the target CA parameter is reconfigured.

Optionally, an example in which the target information further includes the indication field is used for description. Step 212 may be implemented by the following step 212A or step 212B.

Step 212A: In a case that a value of the indication field in the target information is the same as a first value, the second device determines not to update the target CA parameter stored on the second device.

Step 212B: In a case that a value of the indication field in the target information is different from a first value, the second device determines to update the target CA parameter stored on the second device.

The first value may be a value of the indication field last received by the second device.

Optionally, after last receiving L2 control signaling, the second device may store a value of an indication field in the L2 control signaling on the second device.

For example, assuming that a value of a value tag field is 2 bits long, a value of a value tag field that is set earliest may be 0, and 0 may be used to indicate a target CA parameter sent for the first time. Then, if a value of a value tag field in a MAC CE periodically and repeatedly sent each time is still 0, the second device may determine that the target CA parameter is not reconfigured, and determine not to update the target CA parameter stored on the second device; or if a value of a value tag field in a MAC CE sent again is 1 (that is, the value of the value tag field has changed), the second device may determine that the target CA parameter is reconfigured, and determine to update the target CA parameter stored on the second device.

In the CA parameter configuration method provided in this embodiment of this disclosure, the value of the indication field carried in the L2 control signaling may be used to indicate to the second device whether the target CA parameter is reconfigured, so that the second device may determine, according to the value of the indication field, whether to update the target CA parameter stored on the second device.

Optionally, in a case that the target information is L2 control signaling, after step 202A, the CA parameter configuration method provided in this embodiment of this disclosure may further include the following step 213.

Step 213: The second device receives a service based on capability information of the second device and the target CA parameter.

The capability information of the second device may be used to indicate a multi-carrier reception capability of the second device.

Optionally, step 212 may be implemented by the following step (a2) or (b2).

(a2) In a case that the target CA parameter indicates that a first service is transmitted on a first carrier, the second device receives the first service on the first carrier, where the first carrier is a single carrier.

(b2) In a case that the target CA parameter indicates that a first service is transmitted on M second carriers, if the multi-carrier reception capability of the second device is within a capability range indicated by the target CA parameter, the second device receives the first service on the M second carriers; or if the multi-carrier reception capability of the second device is beyond a capability range indicated by the target CA parameter, the second device gives up receiving the first service on the M second carriers, where M is an integer greater than 1.

For example, if the first information in the L2 control signaling received by the second device indicates single-carrier transmission, the second device may receive the first service on the first carrier indicated by the first information.

For example, if the first information in the L2 control signaling received by the second device indicates CA transmission and the multi-carrier reception capability of the second device is within the capability range indicated by the target CA parameter, the second device may attempt to receive the first service on the M second carriers. For the same destination ID/source ID and the same LCID, the second device may determine that data received on a plurality of carriers is data of one service, and send the data to one RLC/PDCP entity for processing.

For example, if the first information in the L2 control signaling received by the second device indicates CA transmission but the multi-carrier reception capability of the second device is beyond the capability range indicated by the target CA parameter (for example, the second device has only a single-carrier reception capability, or it is learned from a V2X higher layer that all carriers on which a service is allowed to be sent go beyond the multi-carrier reception capability of the second device), the second device may give up receiving the first service on the M second carriers.

Optionally, because data packets may be out of order within a period of time after the CA indication information has changed, the second device may continue to perform multi-carrier listening for a period of time after the CA indication information has changed. To be specific, after the "receiving the first service on the M second carriers" in step (b2), the CA parameter configuration method provided in this embodiment of this disclosure may further include the following steps (c2) to (e2).

(c2) The second device receives target indication information sent by the first device, where the target indication information is used to indicate that a second service is transmitted on a third carrier, and the third carrier is a single carrier.

(d2) Within second duration after the target indication information is received, the second device continues to receive the first service on the M second carriers.

(e2) After the second duration, the second device stops receiving the first service on the M second carriers, and starts to receive the second service on the third carrier.

Optionally, the second duration may be a configured, preconfigured, or standard-specified timer length of the timer.

It should be noted that steps (c2) to (e2) are specific to a case of switching from a multi-carrier mode to a single-carrier mode. When the single-carrier mode is switched to the multi-carrier mode, the second device may immediately perform multi-carrier listening without waiting.

In the CA parameter configuration method provided in this embodiment of this disclosure, the second device may continue to perform multi-carrier listening for a period of time when the multi-carrier mode is switched to the single-carrier mode, to avoid incomplete service data reception due to disorder of data packets.

Figure 6:
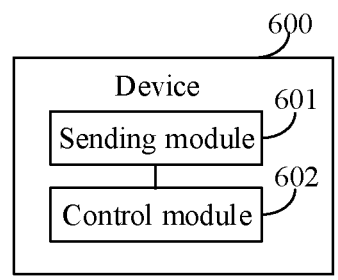
FIG. 6 is a first schematic structural diagram of a device according to an embodiment of this disclosure.

As shown in FIG. 6, an embodiment of this disclosure provides a device 600. The device 600 may be a first device. The first device may include a sending module 601. The sending module 601 may be configured to send first information to a second device, where the first information may be used to indicate a target CA parameter configured for a sidelink service, and the sidelink service may be a sidelink service between the first device and the second device.

Optionally, in this embodiment of this disclosure, the sending module 601 may be configured to send target information to the second device, where the target information may include the first information, and the target information may be any one of: PC5 RRC signaling, an L2 data packet, or L2 control signaling.

Optionally, in this embodiment of this disclosure, the target information is PC5 RRC signaling. The sending module 601 may be further configured to: after sending the target information to the second device, send first control signaling to the second device, where the first control signaling may be used to indicate a processing manner for each of target carrier(s), the processing manner may be activation or deactivation, the target carrier(s) are carriers in carriers corresponding to the target CA parameter, and the first control signaling is L2 control signaling.

Optionally, in this embodiment of this disclosure, if the first information is further used to indicate a primary carrier of CA, the target carrier(s) may be carriers in the carriers corresponding to the target CA parameter other than the primary carrier; or if the first information does not indicate primary carrier of CA, the target carrier(s) may be all of the carriers corresponding to the target CA parameter.

Optionally, in this embodiment of this disclosure, the sending module 601 may be configured to periodically send the target information to the second device, and periodically send the first control signaling to the second device.

Optionally, in this embodiment of this disclosure, the target information is an L2 data packet. As shown in FIG. 6, the first device may further include a control module 602. The control module 602 may be configured to: within first duration after the sending module 601 sends the target information to the second device, prohibit indicating a reconfigured CA parameter to the second device.

Optionally, in this embodiment of this disclosure, the target information is L2 control signaling. The sending module 601 may be further configured to: after sending the target information to the second device, immediately send second control signaling to the second device in a case that the target CA parameter has changed, or periodically send third control signaling to the second device in a case that the target CA parameter remains unchanged, where the second control signaling may include second information, the second information is used to indicate a reconfigured target CA parameter, the second control signaling is L2 control signaling, the third control signaling may include the first information, and the third control signaling may be L2 control signaling.

Optionally, in this embodiment of this disclosure, the sending module 601 may be further configured to: after immediately sending the second control signaling to the second device, periodically send the second control signaling to the second device in a case that the target CA parameter remains unchanged.

Optionally, in this embodiment of this disclosure, the third control signaling may further include an indication field, and the indication field may be used to indicate whether the target CA parameter is reconfigured.

Optionally, in this embodiment of this disclosure, the target CA parameter may include at least one of: a first carrier configuration list, at least one second carrier configuration list, or first indication information corresponding to each service. The first carrier configuration list corresponds to at least one service. Each second carrier configuration list corresponds to one service. First indication information corresponding to one service is used to indicate whether CA transmission is to be performed for the one service.

Optionally, in this embodiment of this disclosure, the target CA parameter may include at least one of: a first carrier activation list, the number of carriers for CA, or second indication information, where the first carrier activation list corresponds to a target service, the second indication information is used to indicate whether CA transmission is to be performed for the target service, and the target service is all services or a specified service.

The device provided in this embodiment of this disclosure is capable of implementing the processes implemented by the first device in the foregoing method embodiments. To avoid repetition, details are not described herein again.

This embodiment of this disclosure provides a device. The device may be the first device. Because the first device may send the first information to the second device, the second device may determine, based on the first information, the target CA parameter configured for the sidelink service between the first device and the second device. Therefore, in some scenarios (for example, a fast transmission scenario), CA data transmission may be performed between the first device and the second device based on the target CA parameter, to improve a transmission rate and a reception effect for the sidelink service, and improve service experience of a user.

Figure 7:
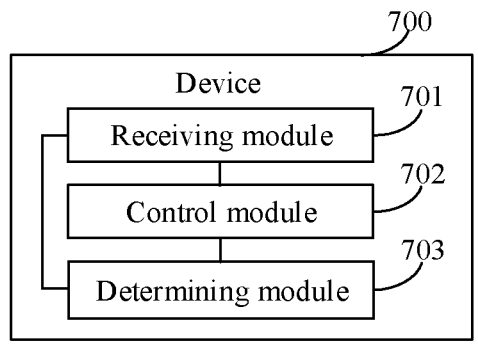
FIG. 7 is a second schematic structural diagram of a device according to an embodiment of this disclosure.

As shown in FIG. 7, an embodiment of this disclosure provides a device 700. The device 700 may be a second device. The second device may include a receiving module 701. The receiving module 701 may be configured to receive first information sent by a first device, where the first information may be used to indicate a target CA parameter configured for a sidelink service, and the sidelink service may be a sidelink service between the first device and the second device.

Optionally, in this embodiment of this disclosure, the receiving module 701 may be configured to receive target information sent by the first device, where the target information includes the first information. The target information may be any one of: PC5 RRC signaling, an L2 data packet, or L2 control signaling.

Optionally, in this embodiment of this disclosure, the target information is PC5 RRC signaling. As shown in FIG. 7, the second device provided in this embodiment of this disclosure may further include a control module 702. The receiving module 701 may be further configured to: after receiving the target information sent by the first device, receive first control signaling sent by the first device, where the first control signaling may be used to indicate a processing manner for each of target carrier(s), the processing manner may be activation or deactivation, the target carrier(s) may be carriers in carriers corresponding to the target CA parameter, and the first control signaling is L2 control signaling. The control module 702 may be configured to activate or deactivate each of the carrier(s) according to the first control signaling received by the receiving module 701.

Optionally, in this embodiment of this disclosure, the target information is an L2 data packet or L2 control signaling. The receiving module 701 may be further configured to: after receiving the target information sent by the first device, receive a service based on capability information of the second device and the target CA parameter. The capability information of the second device may be used to indicate a multi-carrier reception capability of the second device.

Optionally, in this embodiment of this disclosure, the receiving module 701 may be configured to: in a case that the target CA parameter indicates that a first service is transmitted on a first carrier, receive the first service on the first carrier, where the first carrier is a single carrier; or in a case that the target CA parameter indicates that a first service is transmitted on M second carriers, if the multi-carrier reception capability of the second device is within a capability range indicated by the target CA parameter, receive the first service on the M second carriers; or in a case that the target CA parameter indicates that a first service is transmitted on M second carriers, if the multi-carrier reception capability of the second device is beyond a capability range indicated by the target CA parameter, give up receiving the first service on the M second carriers, where M is an integer greater than 1.

Optionally, in this embodiment of this disclosure, the receiving module 701 may be further configured to: after receiving the first service on the M second carriers, receive target indication information sent by the first device; within second duration after the target indication information is received, continue to receive the first service on the M second carriers; and after the second duration, stop receiving the first service on the M second carriers, and start to receive a second service on a third carrier. The target indication information may be used to indicate that the second service is transmitted on the third carrier, and the third carrier is a single carrier.

Optionally, in this embodiment of this disclosure, the target information is L2 control signaling. As shown in FIG. 7, the second device provided in this embodiment of this disclosure may further include a determining module 703. The determining module 703 may be configured to: after the receiving module 701 receives the target information sent by the first device, determine, based on the target information, whether to update a target CA parameter stored on the second device.

Optionally, in this embodiment of this disclosure, the target information may further include an indication field, and the indication field may be used to indicate whether the target CA parameter is reconfigured. The determining module 703 may be configured to: in a case that a value of the indication field is the same as a first value, determine not to update the target CA parameter stored on the second device; or in a case that a value of the indication field is different from a first value, determine to update the target CA parameter stored on the second device. The first value may be a value of the indication field last received by the second device.

Optionally, in this embodiment of this disclosure, the target CA parameter may include at least one of: a first carrier configuration list, at least one second carrier configuration list, or first indication information corresponding to each service. The first carrier configuration list corresponds to at least one service. Each second carrier configuration list corresponds to one service. First indication information corresponding to one service is used to indicate whether CA transmission is to be performed for the one service.

Optionally, in this embodiment of this disclosure, the target CA parameter may include at least one of: a first carrier activation list, the number of carriers for CA, or second indication information, where the first carrier activation list corresponds to a target service, the second indication information is used to indicate whether CA transmission is to be performed for the target service, and the target service is all services or a specified service.

The device provided in this embodiment of this disclosure is capable of implementing the processes implemented by the second device in the foregoing method embodiments. To avoid repetition, details are not described herein again.

This embodiment of this disclosure provides a device. The device may be the second device. Because the second device may receive the first information sent by the first device, the second device may determine, based on the first information, the target CA parameter configured for the sidelink service between the first device and the second device. Therefore, in some scenarios (for example, a fast transmission scenario), CA data transmission may be performed between the first device and the second device based on the target CA parameter, to improve a transmission rate and a reception effect for the sidelink service, and improve service experience of a user.

Figure 8:
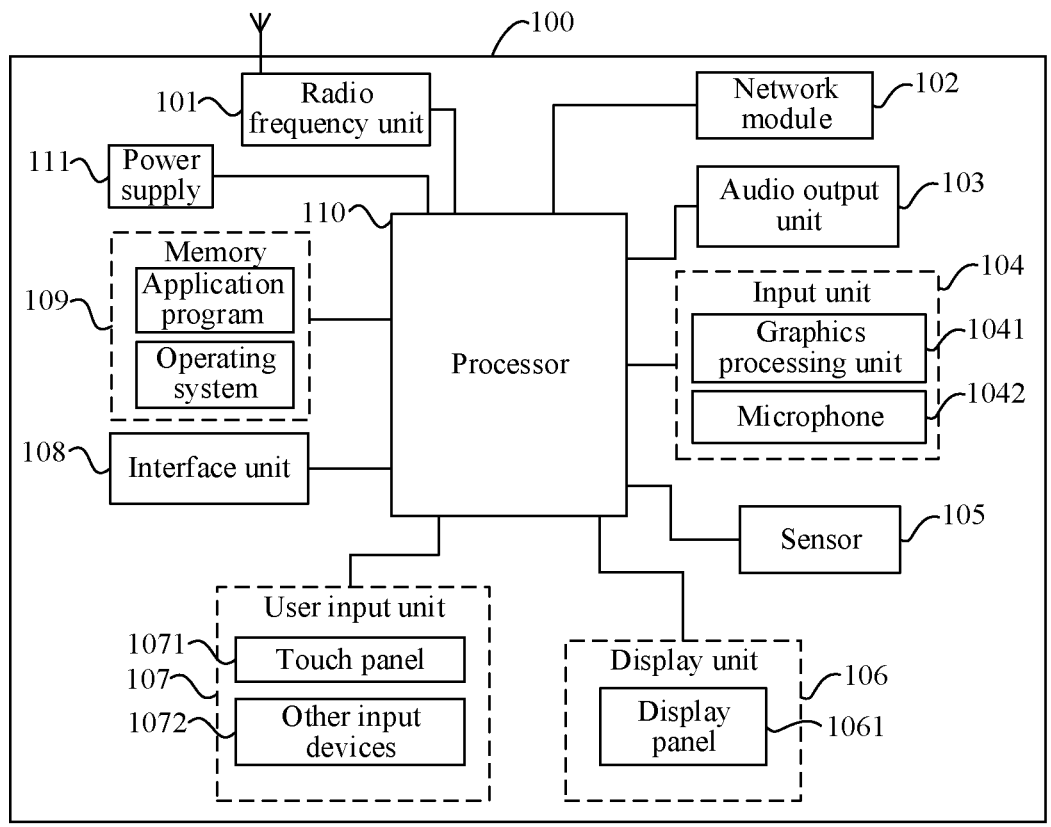
FIG. 8 is a schematic diagram of hardware of UE according to an embodiment of this disclosure.

FIG. 8 is a schematic structural diagram of hardware of UE according to this disclosure. As shown in FIG. 8, the UE 100 includes but is not limited to components such as a radio frequency unit 101, a network module 102, an audio output unit 103, an input unit 104, a sensor 105, a display unit 106, a user input unit 107, an interface unit 108, a memory 109, a processor 110, and a power supply 111. A person skilled in the art can understand that the structure of the UE shown in FIG. 8 does not constitute a limitation on the UE, and the UE may include more or fewer components than those shown in the diagram, or some components may be combined, or the components may be disposed in different manners. In this embodiment of this disclosure, the UE includes but is not limited to a mobile phone, a tablet computer, a notebook computer, a palmtop computer, a wearable device, a pedometer, and the like.

A first possible implementation is as follows: The UE shown in FIG. 8 is the first device in the foregoing embodiments. The radio frequency unit 101 may be configured to send first information to a second device, where the first information is used to indicate a target CA parameter configured for a sidelink service, and the sidelink service is a sidelink service between the first device and the second device.

According to the terminal device provided in this embodiment of this disclosure, because the terminal device may send the first information to the second device, the second device may determine, based on the first information, the target CA parameter configured for the sidelink service between the terminal device and the second device. Therefore, in some scenarios (for example, a fast transmission scenario), CA data transmission may be performed between the terminal device and the second device based on the target CA parameter, to improve a transmission rate and a reception effect for the sidelink service, and improve service experience of a user.

A second possible implementation is as follows: The UE shown in FIG. 8 is the second device in the foregoing embodiments. The radio frequency unit 101 may be configured to receive first information sent by a first device, where the first information is used to indicate a target CA parameter configured for a sidelink service, and the sidelink service is a sidelink service between the first device and the second device.

According to the terminal device provided in this embodiment of this disclosure, because the first device may send the first information to the terminal device, the terminal device may determine, based on the first information, the target CA parameter configured for the sidelink service between the first device and the terminal device. Therefore, in some scenarios (for example, a fast transmission scenario), CA data transmission may be performed between the first device and the terminal device based on the target CA parameter, to improve a transmission rate and a reception effect for the sidelink service, and improve service experience of a user.

It should be understood that in this embodiment of this disclosure, the radio frequency unit 101 may be configured to receive and send a signal in an information sending/receiving or call process, and for example, after receiving downlink data from a base station, send the downlink data to the processor 110 for processing; and also send uplink data to the base station. Usually, the radio frequency unit 101 includes but is not limited to an antenna, at least one amplifier, a transceiver, a coupler, a low noise amplifier, a duplexer, and the like. In addition, the radio frequency unit 101 may further communicate with a network and another device by using a wireless communications system.

The UE 100 provides wireless broadband Internet access for a user by using the network module 102, for example, helps the user send and receive e-mails, browse web pages, and access streaming media.

The audio output unit 103 may convert audio data received by the radio frequency unit 101 or the network module 102 or stored in the memory 109 into an audio signal and output the audio signal as a sound. In addition, the audio output unit 103 may further provide an audio output (for example, a call signal reception sound or a message reception sound) related to a specific function performed by the UE 100. The audio output unit 103 includes a speaker, a buzzer, a receiver, and the like.

The input unit 104 is configured to receive an audio or video signal. The input unit 104 may include a graphics processing unit (GPU) 1041 and a microphone 1042. The graphics processing unit 1041 processes image data of a static picture or a video that is obtained by an image capture apparatus (for example, a camera) in a video capture mode or an image capture mode. A processed image frame may be displayed on the display unit 106. The image frame processed by the graphics processing unit 1041 may be stored in the memory 109 (or another storage medium) or transmitted by the radio frequency unit 101 or the network module 102. The microphone 1042 may receive sounds and process such sounds into audio data. The processed audio data may be converted in a telephone call mode into a format that can be transmitted by the radio frequency unit 101 to a mobile communications base station, for outputting.

The UE 100 further includes at least one sensor 105, for example, an optical sensor, a motion sensor, and another sensor. For example, the optical sensor includes an ambient light sensor and a proximity sensor, where the ambient light sensor can adjust luminance of a display panel 1061 based on brightness of ambient light, and the proximity sensor can turn off the display panel 1061 and/or backlight when the UE 100 is moved to an ear. As a type of motion sensor, an accelerometer sensor can detect magnitudes of accelerations in all directions (usually three axes), can detect a magnitude and a direction of gravity if the mobile phone is in a static state, and can be applied to mobile phone posture recognition (such as screen switching between portrait and landscape, related games, and magnetometer posture calibration), functions related to vibration recognition (such as pedometer and tapping), and the like. The sensor 105 may also include a fingerprint sensor, a pressure sensor, an iris sensor, a molecular sensor, a gyroscope, a barometer, a hygrometer, a thermometer, an infrared sensor, and the like. Details are not described herein.

The display unit 106 is configured to display information entered by the user or information provided for the user. The display unit 106 may include the display panel 1061. The display panel 1061 may be configured in a form of a liquid crystal display (LCD), an organic light-emitting diode (OLED), or the like.

The user input unit 107 may be configured to receive input digit or character information and generate key signal input related to user setting and function control of the UE 100. For example, the user input unit 107 includes a touch panel 1071 and other input devices 1072. The touch panel 1071, also referred to as a touchscreen, may collect a touch operation performed by a user on or near the touch panel 1071 (for example, an operation performed by the user on the touch panel 1071 or near the touch panel 1071 by using a finger or any appropriate object or accessory such as a stylus). The touch panel 1071 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into contact coordinates, transmits the contact coordinates to the processor 110, receives a command transmitted by the processor 110, and executes the command. In addition, the touch panel 1071 may be implemented in a plurality of types, for example, a resistive type, a capacitive type, an infrared type, and a surface acoustic wave type. In addition to the touch panel 1071, the user input unit 107 may further include the other input devices 1072. For example, the other input devices 1072 may include but are not limited to a physical keyboard, a function key (such as a volume control key or an on/off key), a trackball, a mouse, and a joystick. Details are not described herein.

Optionally, the touch panel 1071 may cover the display panel 1061. After detecting a touch operation on or near the touch panel 1071, the touch panel 1071 transmits the touch operation to the processor 110 to determine a type of a touch event. Then the processor 110 provides corresponding visual output on the display panel 1061 based on the type of the touch event. Although in FIG. 8, the touch panel 1071 and the display panel 1061 act as two independent parts to implement input and output functions of the UE, in some embodiments, the touch panel 1071 and the display panel 1061 may be integrated to implement the input and output functions of the UE. This is not limited herein.

The interface unit 108 is an interface connecting an external apparatus to the UE 100. For example, the external apparatus may include a wired or wireless headset port, an external power (or battery charger) port, a wired or wireless data port, a memory card port, a port for connecting an apparatus having an identification module, an audio input/output (I/O) port, a video I/O port, an earphone port, or the like. The interface unit 108 may be configured to receive input (for example, data information and power) from the external apparatus, and transmit the received input to one or more elements of the UE 100, or may be configured to transmit data between the UE 100 and the external apparatus.

The memory 109 may be configured to store software programs and various data. The memory 109 may mainly include a program storage region and a data storage region. The program storage region may store an operating system, an application program required by at least one function (for example, an audio play function or an image play function), and the like. The data storage region may store data (for example, audio data or a phone book) created based on usage of the mobile phone. In addition, the memory 109 may include a high-speed random access memory, or may include a nonvolatile memory, for example, at least one magnetic disk storage device or a flash memory device, or another volatile solid-state storage device.

The processor 110 is a control center of the UE, and is connected to all components of the UE by using various interfaces and lines. By running or executing a software program and/or module that is stored in the memory 109 and calling data stored in the memory 109, the processor 110 executes various functions of the UE and processes data, so as to perform overall monitoring on the UE. The processor 110 may include one or more processing units. Optionally, the processor 110 may integrate an application processor and a modem processor. The application processor mainly processes an operating system, a user interface, an application program, and the like. The modem processor mainly processes wireless communication. It can be understood that the modem processor may be alternatively not integrated in the processor 110.

The UE 100 may further include the power supply 111 (for example, a battery) that supplies power to each component. Optionally, the power supply 111 may be logically connected to the processor 110 by using a power management system, so as to implement functions such as charging management, discharging management, and power consumption management by using the power management system. In addition, the UE 100 includes some function modules that are not shown, details of which are not described herein.

Optionally, an embodiment of this disclosure further provides UE, including a processor 110, a memory 109, and a computer program stored in the memory 109 and executable on the processor 110 that are shown in FIG. 8. When the computer program is executed by the processor 110, the processes of the foregoing method embodiments are implemented, with the same technical effects achieved. To avoid repetition, details are not described herein again.

An embodiment of this disclosure further provides a non-transitory computer-readable storage medium, where the non-transitory computer-readable storage medium stores a computer program. When the computer program is executed by the processor 110 shown in FIG. 8, the processes of the foregoing method embodiments are implemented, with the same technical effects achieved. To avoid repetition, details are not described herein again. For example, the non-transitory computer-readable storage medium is a read-only memory (ROM), a random access memory (RAM), a magnetic disk, or an optical disc.

It should be noted that, in this specification, the terms "include" and "comprise", or any of their variants are intended to cover anon-exclusive inclusion, such that a process, a method, an article, or an apparatus that includes a list of elements not only includes those elements but also includes other elements that are not expressly listed, or further includes elements inherent to such a process, method, article, or apparatus. In absence of more constraints, an element preceded by "includes a . . . " does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this disclosure essentially or a part thereof that contributes to related technologies may be embodied in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The foregoing describes the embodiments of this disclosure with reference to the accompanying drawings. However, this disclosure is not limited to the foregoing implementations. The foregoing implementations are merely illustrative rather than restrictive. As instructed by this disclosure, a person of ordinary skill in the art may develop many other manners without departing from principles of this disclosure and the protection scope of the claims, and all such manners fall within the protection scope of this disclosure.

What is claimed is:

1. A carrier aggregation parameter configuration method, applied to a first device, wherein the method comprises:
   sending first information to a second device, wherein the first information is used to indicate a target carrier aggregation parameter configured for a sidelink service, and the sidelink service is a sidelink service between the first device and the second device;
   wherein the sending first information to a second device comprises:
   sending target information to the second device, the target information comprising the first information; wherein
   in a case that the target information is layer 2 control signaling, after the sending target information to the second device, the method further comprises:
   in a case that the target carrier aggregation parameter has changed, sending second control signaling to the second device, wherein the second control signaling comprises second information, the second information is used to indicate a reconfigured target carrier aggregation parameter, and the second control signaling is layer 2 control signaling; or
   in a case that the target carrier aggregation parameter remains unchanged, periodically sending third control signaling to the second device, wherein the third control signaling comprises the first information, and the third control signaling is layer 2 control signaling;
   wherein after the sending second control signaling to the second device, the method further comprises:
   in a case that the target carrier aggregation parameter remains unchanged, periodically sending the second control signaling to the second device.

2. The method according to claim 1, wherein the third control signaling further comprises an indication field, and the indication field is used to indicate whether the target carrier aggregation parameter has been reconfigured.

3. The method according to claim 1, wherein the target carrier aggregation parameter comprises at least one of: a first carrier configuration list, at least one second carrier configuration list, or first indication information corresponding to each service; and
   the first carrier configuration list corresponds to at least one service, each second carrier configuration list corresponds to one service, and first indication information corresponding to one service is used to indicate whether carrier aggregation transmission is to be performed for the one service; or
   wherein the target carrier aggregation parameter comprises at least one of: a first carrier activation list, a number of carriers for carrier aggregation, or second indication information; and the first carrier activation list corresponds to a target service, the second indication information is used to indicate whether carrier aggregation transmission is to be performed for the target service, and the target service is all services or a specified service.

4. A carrier aggregation parameter configuration method, applied to a second device, wherein the method comprises:
receiving first information sent by a first device, wherein the first information is used to indicate a target carrier aggregation parameter configured for a sidelink service, and the sidelink service is a sidelink service between the first device and the second device;
wherein the receiving first information sent by a first device comprises:
receiving target information sent by the first device, wherein the target information comprises the first information; wherein
in a case that the target information is layer 2 control signaling, after the receiving target information sent by the first device, the method further comprises:
in a case that the target carrier aggregation parameter has changed, receiving second control signaling sent by the first device, wherein the second control signaling comprises second information, the second information is used to indicate a reconfigured target carrier aggregation parameter, and the second control signaling is layer 2 control signaling; or
in a case that the target carrier aggregation parameter remains unchanged, periodically receiving third control signaling sent by the first device, wherein the third control signaling comprises the first information, and the third control signaling is layer 2 control signaling;
wherein after the receiving second control signaling to the second device, the method further comprises:
in a case that the target carrier aggregation parameter remains unchanged, periodically receiving the second control signaling sent by the first device.

5. The method according to claim 4, wherein after the receiving target information sent by the first device, the method further comprises:
receiving a service based on capability information of the second device and the target carrier aggregation parameter, wherein
the capability information of the second device is used to indicate a multi-carrier reception capability of the second device.

6. The method according to claim 5, wherein the receiving a service based on capability information of the second device and the target carrier aggregation parameter comprises:
in a case that the target carrier aggregation parameter indicates that a first service is transmitted on a first carrier, receiving the first service on the first carrier, wherein the first carrier is a single carrier; or
in a case that the target carrier aggregation parameter indicates that a first service is transmitted on M second carriers, if the multi-carrier reception capability of the second device is within a capability range indicated by the target carrier aggregation parameter, receiving the first service on the M second carriers; or if the multi-carrier reception capability of the second device is beyond a capability range indicated by the target carrier aggregation parameter, giving up receiving the first service on the M second carriers; wherein M is an integer greater than 1.

7. The method according to claim 6, wherein after the receiving the first service on the M second carriers, the method further comprises:
receiving target indication information sent by the first device, wherein the target indication information is used to indicate that a second service is transmitted on a third carrier, and the third carrier is a single carrier;
within second duration after the target indication information is received, continuing to receive the first service on the M second carriers; and
after the second duration, stopping receiving the first service on the M second carriers, and starting to receive the second service on the third carrier.

8. The method according to claim 4, wherein after the receiving target information sent by the first device, the method further comprises:
determining, based on the target information, whether to update a target carrier aggregation parameter stored in the second device.

9. The method according to claim 8, wherein the target information further comprises an indication field, and the indication field is used to indicate whether the target carrier aggregation parameter has been reconfigured; and
the determining, based on the target information, whether to update a target carrier aggregation parameter stored in the second device comprises:
in a case that a value of the indication field is same as a first value, determining not to update the target carrier aggregation parameter stored in the second device; or
in a case that a value of the indication field is different from a first value, determining to update the target carrier aggregation parameter stored in the second device, wherein
the first value is a value of the indication field last received by the second device.

10. The method according to claim 4, wherein the target carrier aggregation parameter comprises at least one of following: a first carrier configuration list, at least one second carrier configuration list, or first indication information corresponding to each service; and
the first carrier configuration list corresponds to at least one service, each second carrier configuration list corresponds to one service, and first indication information corresponding to one service is used to indicate whether carrier aggregation transmission is to be performed for the one service.

11. The method according to claim 4, wherein the target carrier aggregation parameter comprises at least one of following: a first carrier activation list, a number of carriers for carrier aggregation, or second indication information; and
the first carrier activation list corresponds to a target service, the second indication information is used to indicate whether carrier aggregation transmission is to be performed for the target service, and the target service is all services or a specified service.

12. A device, wherein the device is a second device, and the second device comprises a processor, a memory, and a computer program stored in the memory and executable on the processor, wherein when the computer program is executed by the processor, steps of the carrier aggregation parameter configuration method according to claim 4 are implemented.

13. The device according to claim 12, wherein the computer program, when executed by the processor, causes the second device to further perform:

receiving a service based on capability information of the second device and the target carrier aggregation parameter, wherein the capability information of the second device is used to indicate a multi-carrier reception capability of the second device.

14. The device according to claim 13, wherein the computer program, when executed by the processor, causes the second device to further perform:

in a case that the target carrier aggregation parameter indicates that a first service is transmitted on a first carrier, receiving the first service on the first carrier, wherein the first carrier is a single carrier; or in a case that the target carrier aggregation parameter indicates that a first service is transmitted on M second carriers, if the multi-carrier reception capability of the second device is within a capability range indicated by the target carrier aggregation parameter, receiving the first service on the M second carriers; or if the multi-carrier reception capability of the second device is beyond a capability range indicated by the target carrier aggregation parameter, giving up receiving the first service on the M second carriers; wherein M is an integer greater than 1.

15. The device according to claim 14, wherein the computer program, when executed by the processor, causes the second device to further perform:

receiving target indication information sent by the first device, wherein the target indication information is used to indicate that a second service is transmitted on a third carrier, and the third carrier is a single carrier;

within second duration after the target indication information is received, continuing to receive the first service on the M second carriers; and after the second duration, stopping receiving the first service on the M second carriers, and starting to receive the second service on the third carrier.

16. The device according to claim 12, wherein the computer program, when executed by the processor, causes the second device to further perform:

determining, based on the target information, whether to update a target carrier aggregation parameter stored in the second device.

17. The device according to claim 16, wherein the target information further comprises an indication field, and the indication field is used to indicate whether the target carrier aggregation parameter has been reconfigured; and the computer program, when executed by the processor, causes the second device to perform:

in a case that a value of the indication field is same as a first value, determining not to update the target carrier aggregation parameter stored in the second device; or in a case that a value of the indication field is different from a first value, determining to update the target carrier aggregation parameter stored in the second device, wherein the first value is a value of the indication field last received by the second device.

18. A device, wherein the device is a first device, and the first device comprises a processor, a memory, and a computer program stored in the memory and executable on the processor; the computer program, when executed by the processor, causes the first device to perform:

sending first information to a second device, wherein the first information is used to indicate a target carrier aggregation parameter configured for a sidelink service, and the sidelink service is a sidelink service between the first device and the second device;

wherein the computer program, when executed by the processor, causes the first device to perform:

sending target information to the second device, the target information comprising the first information; wherein in a case that the target information is layer 2 control signaling, the computer program, when executed by the processor, causes the first device to further perform:

in a case that the target carrier aggregation parameter has changed, sending second control signaling to the second device, wherein the second control signaling comprises second information, the second information is used to indicate a reconfigured target carrier aggregation parameter, and the second control signaling is layer 2 control signaling; or in a case that the target carrier aggregation parameter remains unchanged, periodically sending third control signaling to the second device, wherein the third control signaling comprises the first information, and the third control signaling is layer 2 control signaling;

wherein the computer program, when executed by the processor, causes the first device to further perform:

in a case that the target carrier aggregation parameter remains unchanged, periodically sending the second control signaling to the second device.

19. The device according to claim 18, wherein the third control signaling further comprises an indication field, and the indication field is used to indicate whether the target carrier aggregation parameter has been reconfigured.

20. The device according to claim 18, wherein the target carrier aggregation parameter comprises at least one of: a first carrier configuration list, at least one second carrier configuration list, or first indication information corresponding to each service; and the first carrier configuration list corresponds to at least one service, each second carrier configuration list corresponds to one service, and first indication information corresponding to one service is used to indicate whether carrier aggregation transmission is to be performed for the one service; or wherein the target carrier aggregation parameter comprises at least one of: a first carrier activation list, a number of carriers for carrier aggregation, or second indication information; and the first carrier activation list corresponds to a target service, the second indication information is used to indicate whether carrier aggregation transmission is to be performed for the target service, and the target service is all services or a specified service.

* * * * *